United States Patent

Boissier et al.

[15] 3,697,590
[45] Oct. 10, 1972

[54] PHENYLACETIC ACIDS AND THEIR SALTS

[72] Inventors: Jacques R. Boissier, Paris; Roger Ratouis, Saint-Cloud, both of France

[73] Assignee: Societe anonyme dite: Roussel-UCLAF, Paris, France

[22] Filed: July 28, 1969

[21] Appl. No.: 848,141

[30] Foreign Application Priority Data

July 30, 1968 France.....................68161159
Oct. 24, 1968 France.....................68171217

[52] U.S. Cl.............260/518 R, 260/243 A, 424/319
[51] Int. Cl............................................C07c 101/44
[58] Field of Search....................260/518 R, 243 A

[56] References Cited

UNITED STATES PATENTS 3,102,871   9/1963   Spacht.................260/243 AB

OTHER PUBLICATIONS

Theilheimer, W. " Synthetic Methods of Organic Chemistry," Vol. 18 (1964), pub. S. Krager, N.Y. QD242 T4C2 Page 55.

*Primary Examiner*—Lorraine A. Weinberger
*Assistant Examiner*—L. Arnold Thaxton
*Attorney*—Davis, Hoxie, Faithfull & Hapgood

[57] ABSTRACT

Phenylacetic acid derivatives having the formula:

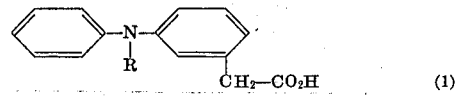

(1)

where R represents an hydrogen or a methyl radical.

Compounds of formula (1) and their metallic and amine salts are very useful substances in human therapeutics, namely as analgesic, antipyretic and antiinflamatory medicines.

Compounds of formula (1) are prepared by reacting a 2-phenothiazinylacetic acid of formula:

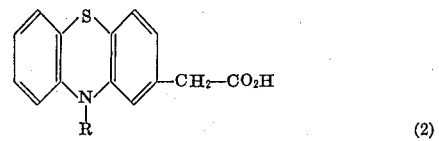

(2)

with a desulfurizing reducing agent.

3 Claims, No Drawings

NEW PHENYLACETIC ACIDS AND THEIR SALTS

The present invention relates to new phenylacetic acid derivatives and their metallic and amine salts and the process for preparation thereof.

The compounds according to this invention have proved to be useful in human therapeutics, namely as analgesic, antipyretic and antiinflammatory medicines.

The new derivatives of phenylacetic acid, according to the invention, are represented by the formula:

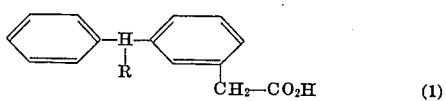

(1)

where R represents an hydrogen atom or a methyl radical.

According to the invention, the process for the preparation of the compounds of formula (1) comprises reacting a 2-phenothiazinylacetic acid of formula:

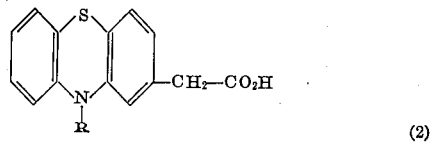

(2)

where R has the meaning defined above, with a desulfurizing reducing agent and isolating the resulting compound of formula (1).

A desulfurizing reducing agent means a reducing agent able to break the carbon-sulfur bonds and to form two new carbon hydrogen bonds on the two benzene rings (desulfuration reaction).

In the preferred conditions for carrying out the process, the desulfurizing reducing agent used is: — either hydrogen, generated in situ by reacting an aqueous sodium hydroxide solution with Raney nickel alloy (nickel aluminum alloy); this alloy can advantageously be added gradually to the mixture of compound of formula (2) with an aqueous solution of sodium hydroxide; at the end of the addition, the reactive mixture can advantageously be heated on water bath to finish off the reaction; mineral products are then separated by filtration and the desired compound of formula (1) is isolated from the aqueous filtrate by acidification and extraction, — or hydrogen iodide in the form of a concentrated aqueous solution. In this case the mixture of the compound of formula (2) and of the aqueous solution of hydrogen iodide is boiled under reflux for 10 hours to 40 hours. At the completion of the reaction the desired compound formula (1) is isolated from the reaction mixture by extraction.

According to an alternative method of the process of the invention, the compounds of formula (1) where R represents a methyl radical, can be prepared by reacting a compound of formula (1) where R is a hydrogen atom and an alkali-metal compound, such as sodium amide, capable of replacing the hydrogen atom with an alkali-metal atom; and then condensing the resulting metallic compound with a methylating agent.

This alternative method is preferentially carried out by using sodium amide, as the alkali-metal compound, in liquid ammonia, and methyl iodide as the methylating agent. Preferably, at least two moles of sodium amide and two moles of methyl iodide are used per mole of compound to be methylated. The action of the methyl iodide is preferentially performed in anhydrous ether. When the reaction is over, the compounds of formula (1) where R represents a methyl radical is isolated from the reaction mixture by acidification and extraction.

Salts of acids of the above formula (1) can be prepared, according to the invention, by reacting corresponding mineral bases or amines with said acids, performing the reaction in a solvent such as a lower alcohol (for instance methanol or ethanol). Said mineral bases may be, for instance, alkaline bases, alkaline-earth bases or ammonia. When the reaction is over, the solvent may be removed by concentration under vacuum and the resulting salt may be purified by recrystallization.

The compounds of formula (1) and their salts are useful substances for human therapeutics namely because of their remarkable analgesic, antipyretic and antiinflammatory properties.

Pharmacological studies of the compounds of this invention have shown their great activity and interest. The activity of the following two compounds was studied in detail: (3-anilino phenyl) acetic acid (hereinafter referred as S. D. 2 111–01) and (N-methyl 3-anilino phenyl) sodium acetate (hereinafter referred as S. D. 2 111–02). Pharmacological tests and their results were as follows.

Analgesic power was studied in mice, by means of the phenylbenzoquinone test according to SIEGMUND et al. (Proc. Soc. Exper. Biol. N. Y. 1957, 95, 729). Protection by the administration of a tested compound was expressed in percentage according to the following formula:

$$\% \text{ protection} = 100 \left[ 1 - \frac{\text{Numbers of writhings in treated animals}}{\text{Numbers of writhings in control animals}} \right]$$

Results were as follows:

TABLE

| Administered doses (mg/kg – per os) | % of protection | |
|---|---|---|
| | S.D. 2111–01 | S.D. 2111–02 |
| 800 | 100 | 100 |
| 200 | 90 | 85 |
| 50 | 53 | 79 |
| 12,5 | 16 | 43 |

Antipyretic power was evaluated in rats against pyrexia induced by a sub-cutaneous injection of a suspension of yeast (1 ml/100 g of animal of a 12 percent yeast suspension). Tested compounds were administered per os at a dose of 200 mg/kg. The percentage of inhibition of the experimental hyperthermia was expressed as follows:

$$\% \text{ of inhibition} = 100 \left[ 1 - \frac{\epsilon\Delta \text{ tested animals}}{\epsilon\Delta \text{ control animals}} \right]$$

; $\Delta$ represents the hourly algebric variation of rectal temperature with regard to the initial rectal temperature, temperatures being noted at hourly intervals for 6 hours. Under the conditions the S.D. 2 111–01 produced an inhibition of 56 percent and the S.D. 2 111–02 of 93 percent.

Antiinflammatory activity was evaluated in guineapig by means of the tetrahydrofurfuryl nicotinat test according to HAINING's technic (Brit. J. Pharmacol. 1963, 21, 104). Tested products being administered per os, S.D. 2 111–01 was able to insure a partial protection from the dose of 50 mg/kg and a complete protection from the dose of 200 mg/kg; S.D. 2 111–02 was able to insure a partial protection from the dose of 10 mg/kg and a complete protection from the dose of 50 mg/kg.

It was observed that tested compounds are endowed with a low toxicity since, for instance, the oral administration in mice of 1 g/kg of S.D. 2 111–01 did not induce any mortality and since under the same conditions and for the same dose S.D. 2 111–02 induced only 30 percent of the mortality.

Owing to their pharmacological activities compounds of formula (1) and their salts are useful medicines namely in the treatment of various algies, of febrile diseases, of acute or chronical rheumatisms. The usual dose varies according to the used product, the treated patient, the concerned complaint; it may be for instance from 0.250 g to 2.5 g per day, per os in human beings.

As medicines, these substances can be employed either in the form of acids or in the form of pharmaceutically acceptable salts. Such salts can be for instance salts obtained with alkali metals, alkaline-earth metal or ammonium.

The present invention is also concerned with the pharmaceutical compositions which comprise as active principle one or several of the compounds of formula (1) and/or their metallic salts and/or their salts of amines. These compositions are prepared so that they can be administered by digestive, parenteral or local routes. They may be solid or liquid and be provided in the pharmaceutical forms usually employed in human medicine, such as for example tablets, coated or not, capsules, granulated substances, suppositories, parenteral preparations, ointments, creams and gels; they are prepared according to usual methods. The active principle or principles thereof may be incorporated with usual excipients, which are normally used in those pharmaceutical compositions, such as talcum, arabic gum, lactose, starch magnesium stearate, cocoa butter, aqueous or non aqueous vehicles, various animal or vegetable fatty substances, paraffins, glycols, various wetting, dispersing and emulsifying agents, preservatives.

The following non limiting examples illustrate the invention :

EXAMPLE 1

(3-Anilino phenyl) acetic acid 10 g of 2-phenothiazinylacetic acid were suspended in 1 l of a 10 percent sodium hydroxide solution containing 5 ml of n-amyl alcohol. Then, 100 g of Raney nickel alloy were added in small portions, with stirring. When the addition was over, the mixture was heated on a steam-bath for 2 hours. Insoluble matter was separated from the solution by filtration while hot, and washed with 100 ml of a 10 percent sodium hydroxide solution. The alkaline solutions were then collected, cooled, and acidified by adding concentrated hydrochloric acid. The product which had separated was extracted with ether. Evaporation of the dried (sodium sulfate) ethereal solution gave a cristalline product which was recrystallized from benzene to give 5 g (56 percent) of (3-anilino phenyl) acetic acid as white crystals. Melting point : 138°–140° C on open capillary.

EXAMPLE 2

(3-Anilino phenyl) acetic acid

A mixture of 10 g of 2-phenothiazinylacetic acid and 150 ml of 57 percent hydriodic acid was boiled for 20 hours under reflux with stirring. After cooling, the mixture was diluted with water and extracted with ether. Ethereal brown phase was washed with an aqueous sodium thiosulfate solution until decoloration, then with water. Evaporation of the dried (sodium sulfate) ethereal solution gave a cristalline product which was recrystallized from benzene to give 5.5 g (62 percent) of (3-anilino phenyl) acetic acid as white crystals. This product was identical with the one obtained according to the process described in example 1. Melting point : 138°–140° C on open capillary.

Analysis: $C_{14} H_{13} N O_2$

|  | C | H | N |
|---|---|---|---|
| Calculated % | 74.0 | 5.8 | 6.2 |
| Found % | 74.0 | 5.9 | 6.2 |

EXAMPLE 3

(N-methyl 3-anilino phenyl)acetic acid

Following the procedure described in example 1, but starting from 10 g of 2-(10-methyl phenothiazinyl) acetic acid, the aqueous acid solution was extracted with benzene ; benzenic extracts were evaporated under vacuum to give 7.5 g (84 percent) of (N-methyl 3-anilino phenyl)acetic acid as a light yellow oil which cristallized slowly. Melting point on a hot stage microscope: 47°–50° C.

EXAMPLE 4

(N-methyl 3-anilino phenyl) sodium acetate 30.5 ml of a N aqueous sodium hydroxide solution were added to the solution of 7.5 g of (N-methyl 3-anilino phenyl) acetic acid, obtained according to the process described in example 3, in 50 ml of ethanol. Solvents were removed under vacuum and the resulting solid residue was washed with benzene. After drying, the residue was recrystallized from 60 ml of isopropanol to give 5 g (61 percent) of (N-methyl 3-anilino phenyl) sodium acetate as water-soluble white crystals. Melting point: 136°–140° C on a hot stage microscope.

Analysis: $C_{15} H_{14} N Na O_2$

|  | C | H |
|---|---|---|
| Calculated % | 68.4 | 5.4 |
| Found % | 68.8 | 5.5 |

EXAMPLE 5

(N-methyl 3-anilino phenyl) acetic acid 6 g (0.0265 mole) of (3-anilino phenyl) acetic acid prepared according to the process described in example 1 were added in small portions to a suspension of 2.3 g (0.059 mole) of sodium amide in 150 ml of liquid ammonia. The reaction mixture was stirred for 30 minutes, then a solution of 8.3 g (0.059 mole) of methyl iodide in 50 ml of anhydrous ether was added dropwise and the mixture was stirred for 30 minutes. Ammonia was removed and 100 ml of water and 50 ml of ether were successively added. Aqueous phase was separated by decantation, acidified by adding 60 ml of a N aqueous hydrochloric acid solution and extracted with benzene. Benzene was removed under vacuum to give 5.5 g (83 percent) of (N-methyl 3-anilino phenyl) acetic acid as a yellow oil which cristallized slowly. Melting point on a hot stage microscope : 47°–50° C. This product is identical to the one obtained by the process described in example 3.

EXAMPLE 6

Tablets were prepared which corresponded to the formula:

| | |
|---|---|
| (3-anilino phenyl) acetic acid | 100 mg |
| Excipient s.q. to make | 250 mg |

(Excipient : lactose, starch, talcum, magnesium stearate).

EXAMPLE 7

Tablets were prepared which correspond to the formula :

| | |
|---|---|
| (N-methyl 3-anilino phenyl) sodium acetate | 100 mg |
| Excipient s.q. to make | 250 mg |

(Excipient : lactose, starch, talcum, magnesium stearate).

EXAMPLE 8

Suppositories were prepared which corresponded to the formula :

| | |
|---|---|
| (N-methyl 3-anilino phenyl) sodium acetate | 0.200 g |
| Excipient s.q. to make | 3 g |

EXAMPLE 9

Parenteral preparations were realized which corresponded to the formula :

| | |
|---|---|
| (N-methyl 3-anilino phenyl) sodium acetate | 400 mg |
| Excipient s.q. to make | 4 ml |

EXAMPLE 10

An ointment was prepared which corresponded to the formula :

| | |
|---|---|
| (N-methyl 3-anilino phenyl) sodium acetate | 5 g |
| Excipient s.q. to make | 100 g |

We claim:

1. A compound selected from the group consisting of derivatives of phenylacetic acid and their alkali-metal, alkaline-earth metal and ammonium salts, said derivatives having the formula:

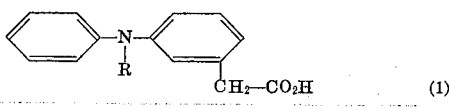

wherein R is a member selected from the group consisting of a hydrogen atom and a methyl radical.

2. A compound selected from the group consisting of (3-anilino phenyl) acetic acid, and its alkali-metal, alkaline-earth metal and ammonium salts.

3. A compound selected from the group consisting of (N-methyl 3-anilino phenyl) acetic acid, and its alkali-metal, alkaline-earth metal and ammonium salts.

* * * * *